United States Patent
Singh

(10) Patent No.: US 6,219,625 B1
(45) Date of Patent: Apr. 17, 2001

(54) SHOE INCLUDING WEIGHT AND DISTANCE TRAVELED MONITOR

(76) Inventor: Shehnaz Saini Singh, P.O. Box 6343, North Babylon, NY (US) 11703

( * ) Notice: Subject to any disclaimer, the term of this patent is extended or adjusted under 35 U.S.C. 154(b) by 0 days.

(21) Appl. No.: 09/193,463

(22) Filed: Nov. 17, 1998

(51) Int. Cl.[7] .................................................. G01B 5/04
(52) U.S. Cl. ........................................ 702/160; 235/105
(58) Field of Search ................... 36/136, 139; 364/561; 340/825.573; 73/490, 172; 33/700

(56) References Cited

U.S. PATENT DOCUMENTS

| | | | |
|---|---|---|---|
| 4,771,394 | * | 9/1988 | Cavanagh .............................. 364/561 |
| 5,269,081 | * | 12/1993 | Gray ....................................... 36/136 |
| 5,357,696 | * | 10/1994 | Gray et al. .............................. 36/136 |

* cited by examiner

Primary Examiner—Marc S. Hoff
Assistant Examiner—Edward Raymond
(74) Attorney, Agent, or Firm—Michael I. Kroll

(57) ABSTRACT

A shoe including weight and distance traveled monitoring device for determining a weight and distance traveled by a person wearing the shoe. The weight and distance traveled monitoring device includes a device for sensing a pressure and generating a signal indicative of the sensed pressure positioned in a heel of the shoe and a device for measuring a distance traveled by the shoe and generating a signal indicating the measured distance positioned in the heel of the shoe. A microprocessor is connected to receive the signal from the sensing device and the signal from the measuring device for processing the received signals to determine a weight of the person wearing the shoe and a distance traveled by the person wearing the shoe. A device is provided for producing and communicating an audible signal indicating the determined weight and distance traveled to the person wearing the shoe. A memory device is connected to the microprocessor for storing the determined weights and distances traveled and a timer for detecting a predetermined period during which the person wearing the shoe is inactive and triggering said microprocessor to generate an audible signal prodding the person to exercise, the timer being reset by the microprocessor upon receipt of the signal from the measuring device.

19 Claims, 7 Drawing Sheets

SHOE INCLUDING WEIGHT AND DISTANCE TRAVELED MONITOR

BACKGROUND OF THE INVENTION

1. Field of the Invention

The present invention relates generally to shoes and, more specifically, to a shoe including a device for monitoring and recording a users weight and distance traveled in the shoes, the weight and distance traveled being communicated to the user at predetermined times and as desired by the user.

2. Description of the Prior Art

Footwear has been produced and worn by people for thousands of years. The footwear has taken on many different shapes and styles but has served the same main purpose over its existence, to protect and cover the feet of the wearer. Over time, the footwear has been redesigned to provide additional comfort and support for the user and even to provide certain information to a user. Numerous types of shoes including devices for measuring different quantities have been provided in the prior art. While these devices may be suitable for the particular purpose to which they address, they would not be as suitable for the purposes of the present invention as heretofore described.

It is thus desired to provide a device which can be unobtrusively positioned within the heel of a shoe or sneaker and will measure a user's weight and a distance traveled by the user while wearing the shoes. It is further desired to provide a device which is able to generate an alarm signal upon determining the user has gained weight or has not walked or ran in a predetermined period of time while wearing the shoes. It is even further desired to provide a device which will track the distance traveled by the user and the fluctuations in the weight of the user over a predetermined period of time. It is still further desired to provide a device which will communicate the measured weight and distance traveled to the user via an audible signal.

SUMMARY OF THE PRESENT INVENTION

The present invention relates generally to shoes and, more specifically, to a shoe including a device for monitoring and recording a users weight and distance traveled in the shoes, the weight and distance traveled being communicated to the user at predetermined times and as desired by the user.

A primary object of the present invention is to provide a shoe including weight and distance traveled monitoring device that will overcome the shortcomings of prior art devices.

Another object of the present invention is to provide a shoe including weight and distance traveled monitoring device which is able to determine a body weight of a user.

A further object of the present invention is to provide a shoe including weight and distance traveled monitoring device including a tachometer for measuring a distance traveled by the user when wearing the shoes.

A yet further object of the present invention is to provide a shoe including weight and distance traveled monitoring device wherein the device is able to audibly communicate the measured weight and distance traveled by the user.

A still further object of the present invention is to provide shoe including weight and distance traveled monitoring device including an interactive button which the user may activate to be informed of their weight and distance traveled.

A yet further object of the present invention is to provide shoe including weight and distance traveled monitoring device able to measure time of inactivity of a user and generate an alarm signal if the user has been inactive for a predetermined period of time.

A still further object of the present invention is to provide shoe including weight and distance traveled monitoring device able to provide audible encouragement upon determining user has lost weight between times of measurement or induce a user to exercise upon determining the user has gained weight between times of measurements.

Another object of the present invention is to provide a shoe including weight and distance traveled monitoring device that is simple and easy to use.

A still further object of the present invention is to provide a shoe including weight and distance traveled monitoring device that is economical in cost to manufacture.

Additional objects of the present invention will appear as the description proceeds.

A shoe including weight and distance traveled monitoring device for determining a weight and distance traveled by a person wearing the shoe is disclosed by the present invention. The weight and distance traveled monitoring device includes a device for sensing a pressure and generating a signal indicative of the sensed pressure positioned in a heel of the shoe and a device for measuring a distance traveled by the shoe and generating a signal indicating the measured distance positioned in the heel of the shoe. A microprocessor is connected to receive the signal from the sensing device and the signal from the measuring device for processing the received signals to determine a weight of the person wearing the shoe and a distance traveled by the person wearing the shoe. A device is provided for producing and communicating an audible signal indicating the determined weight and distance traveled to the person wearing the shoe. A memory device is connected to the microprocessor for storing the determined weights and distances traveled and a timer for detecting a predetermined period during which the person wearing the shoe is inactive and triggering said microprocessor to generate an audible signal prodding the person to exercise, the timer being reset by the microprocessor upon receipt of the signal from the measuring device.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
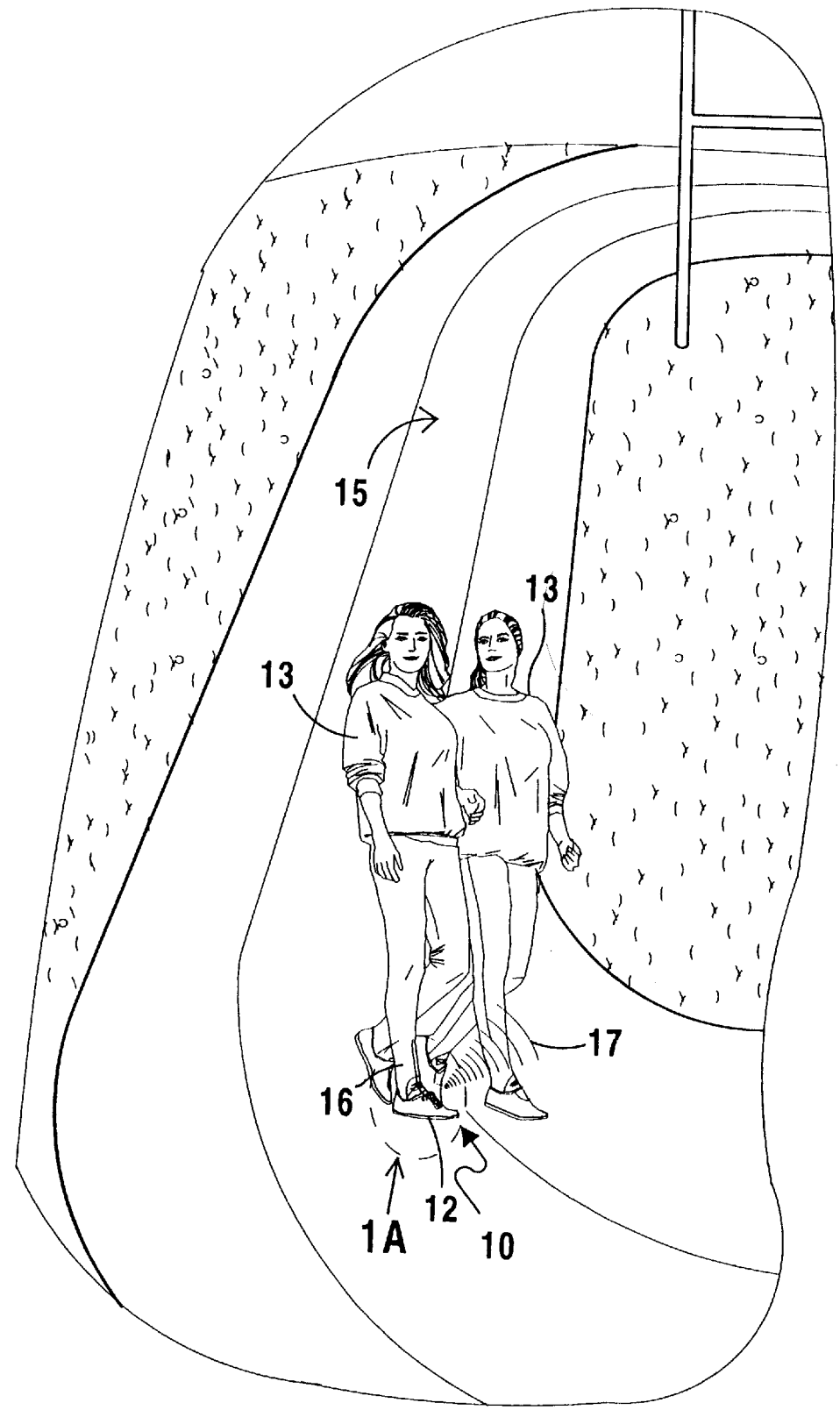
FIG. 1 is a perspective view of a couple of people traveling along a path wearing the shoe including weight and distance traveled monitoring device of the present invention.

Turning now descriptively to the drawings, in which similar reference characters denote similar elements throughout the several views, the Figures illustrate the shoe including weight and distance traveled monitoring device of the present invention. With regard to the reference numerals used, the following numbering is used throughout the various drawing figures.

- 10 weight and distance traveled monitoring device of the present invention
- 12 shoe in which weight and distance traveled monitoring device is positioned
- 13 people wearing shoe including weight and distance traveled monitoring device
- 14 heel of shoe
- 15 path along which people are walking
- 16 foot of user
- 17 arced lines representing sound produced by weight and distance traveled monitoring device
- 18 laces of shoe
- 19 plurality of control buttons
- 20 bottom of shoe
- 22 controller of weight and distance traveled monitoring device
- 24 power source of weight and distance traveled monitoring device
- 25 pressure sensor
- 26 speaker of weight and distance traveled monitoring device
- 27 pedometer
- 28 manual activation button of weight and distance traveled monitoring device
- 30 power switch of weight and distance traveled monitoring device
- 32 microprocessor
- 34 pressure/weight sensor
- 36 tachometer
- 38 memory
- 40 clock
- 42 reset buttons
- 44 timer

DETAILED DESCRIPTION OF THE PREFERRED EMBODIMENT

Turning now descriptively to the drawings, in which similar reference characters denote similar elements throughout the several views, FIGS. 1 through 4 illustrate the shoe including weight and distance traveled monitoring device of the present invention, the weight and distance traveled monitoring device is indicated generally by the numeral 10 and is positioned within the shoe which is indicated by the numeral 12.

FIG. 1 illustrates the shoe 12 including weight and distance traveled monitoring device 10 being worn by people 13 as they travel along a path 15. The weight and distance traveled monitoring device 10 is positioned within a heel 14 of the shoe 12 and is thus unobtrusive and does not hamper the user's 13 ability to walk or run. The arced lines emanating from the shoe 12 and identified by the numeral 17 illustrate the ability of the weight and distance traveled monitoring device 10 to communicate information to the user 13. This information includes but is not limited to a measured weight of the user, a distance traveled by the user, words of encouragement when it is determined the user has lost weight and statements designed to prod the user to exercise when the user has been idle or inactive for a predetermined period of time. As the users 13 continue to travel around the track 15 the weight and distance traveled monitoring device 10 will continue to measure the distance traveled and record the distance traveled during the present exercise session along with the total distance traveled over a predetermined period of time.

Figure 1A:
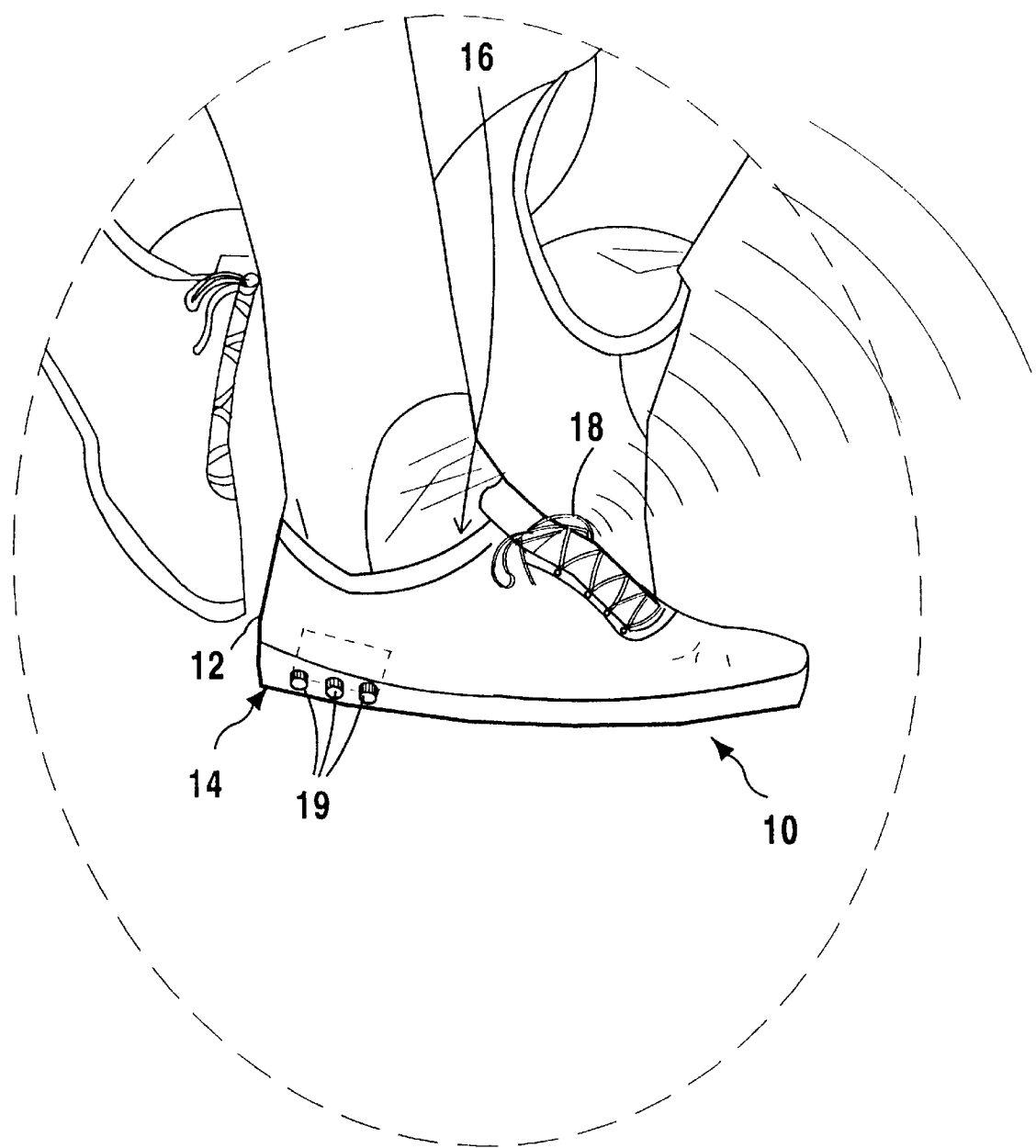
FIG. 1A is an enlarged side perspective view of the shoe including the shoe including weight and distance traveled monitoring device of the present invention being worn by a user taken from within the circle labeled 1A in FIG. 1.

An enlarged view of the shoe 12 including the weight and distance traveled monitoring device 10 positioned within the heel 14 thereof is illustrated in FIG. 1A. From this view, it can be seen that the shoe 12 is designed similar to any conventional shoe or sneaker including laces 18 for releasably securing the shoe 12 to the foot 16 of the user 13. Extending from a side of the shoe 12 near the heel 14 are a plurality of buttons 19 for activating the weight and distance traveled monitoring device 10 as will be described hereinafter with specific reference to FIG. 2.

Figure 2:
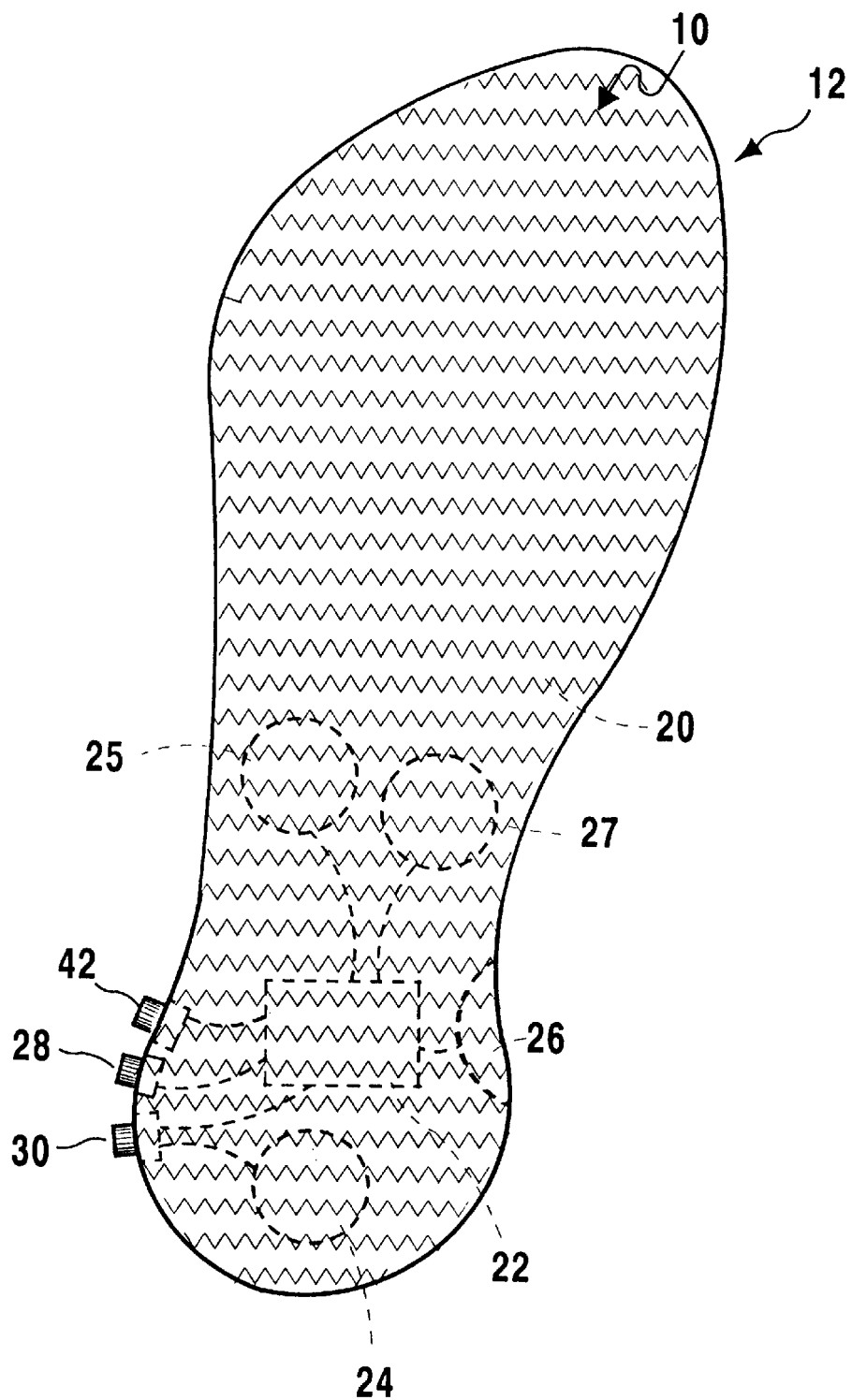
FIG. 2 is a bottom view of the shoe including weight and distance traveled monitoring device of the present invention.

A base side 20 of the shoe 12 in which the weight and distance traveled monitoring device 10 is positioned is illustrated in FIG. 2. As can be seen from this figure, the weight and distance traveled monitoring device 10 includes a controller 22 located in the heel 14 of the shoe 12 for controlling the computational activities of the device 10. A power source 24 is also located in the heel 14 of the shoe 12 and is connected to the controller 22 via a power switch 30. The user will activate the power switch 30 when the shoes 12 are being worn and it is desired to measure the weight or distance to be traveled. Also connected to the controller 22 is a pressure sensor 25 and a pedometer 27. The pressure sensor 25 will measure a pressure applied thereto due to the weight of the user when the user stands. This measured pressure will be sent to the controller and used to determine the weight of the user. The controller 22 will take into consideration that pressure is only being measured at one foot when calculating the weight of the user. The pedometer 27 will measure the distance traveled by the user when walking or running and provide such information to the controller 22 for storage and later use. A speaker 26 is also connected to the controller 22 for providing an audible signal to the user either communicating information calculated by the controller such as weight and distance traveled or to produce words encouraging the user to exercise. A button 28 is provided for manually activating the weight and distance traveled monitoring device 10 to communicate the measured weight and distance traveled through the speaker 26. Another button 42 is provided for resetting the distance traveled counter in the controller 22.

Figure 3:
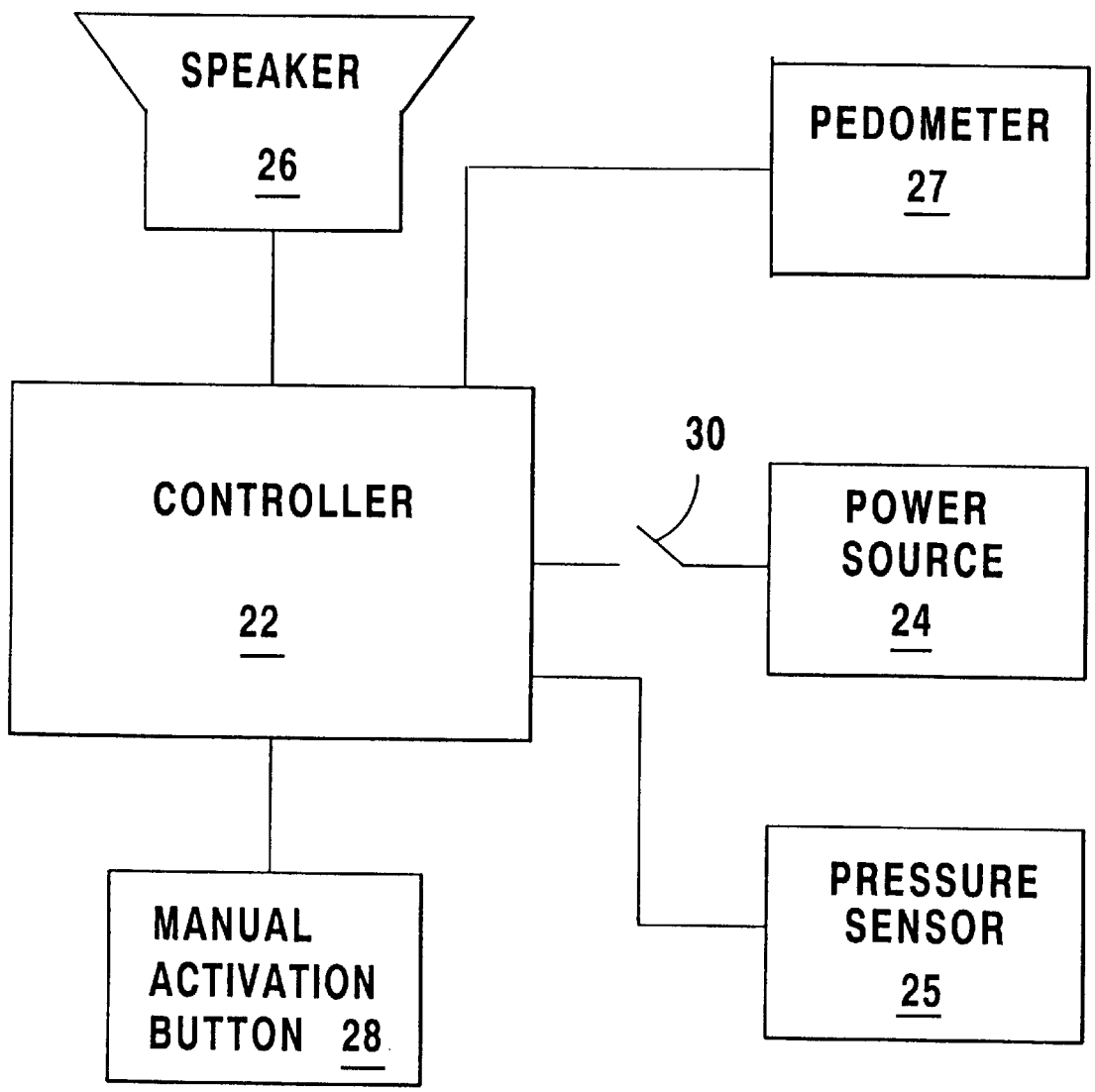
FIG. 3 is a block diagram of the shoe including weight and distance traveled monitoring device of the present invention.

A simplified block diagram of the weight and distance traveled monitoring device 10 is illustrated in FIG. 3. This figure illustrates the controller 22 connected to the power source 24 through the power switch 30. The pressure sensor 25 and pedometer 27 are also connected to the controller 22 for sending the signals representative of the values measured thereby to the controller 22 for processing. The speaker 26 is connected to the controller 22 for producing an audible signal communicating the values obtained from the calculations performed in the controller 22 and producing words of encouragement for the user based upon weight loss and when the user has been inactive for over a predetermined time period. The manual activation button 28 triggers the controller 22 to send a signal to the speaker 26 causing an audible signal stating the measured weight of and distance traveled by the user.

Figure 4:
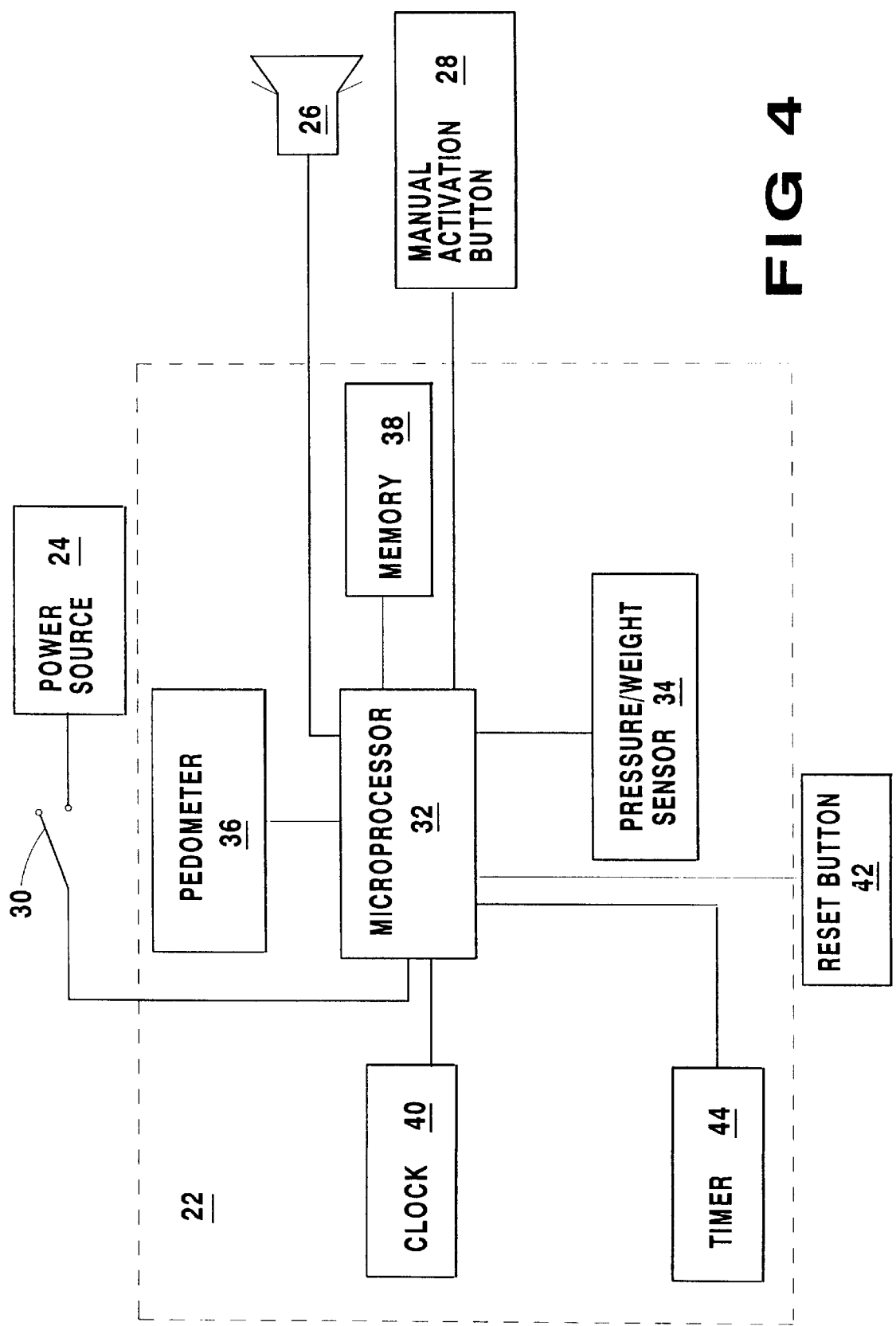
FIG. 4 is a block diagram of the controller of the shoe including weight and distance traveled monitoring device of the present invention.

A detailed schematic diagram of the controller 22 including all components connected thereto is illustrated in FIG. 4. This figure illustrates the internal elements of the controller 22 which include a microprocessor 32 connected to the pressure/weight sensor 34 and the pedometer 36. The power source 24 is located externally to the controller 22 and is connected to the microprocessor 32 through the power switch 30. A memory 38 is also connected to the microprocessor 32 for storing the software needed to control the processing of information received by the microprocessor 32 and values calculated by the microprocessor 32. A clock 40 is also connected to the microprocessor 32 for counting a period of time over which measurements will be taken before the memory is cleared. The clock 40 is also connected directly to the power supply 26 and thus continues to operate when the power switch 30 is placed in the off position interrupting the supply of power to the microprocessor. Thus, the user can store values of weight over a predetermined period of time and thereby compare changes in weight over the predetermined period. The user is thus also able to keep a running total of distance traveled over the predetermined time and keep track of how far the user traveled in the shoes 12 during the predetermined time period. A timer 44 is also provided to measure periods during which the user remains inactive such as when the user is sitting on a couch or chair and not exercising in some manner. When the timer 44 expires it is determined that the user has remained inactive for a predetermined period and the microprocessor 32 is triggered to generate an audible signal which will be sent to the speaker 26. The audible signal will communicate words of encouragement to the user and prodding the user to begin exercising. The timer 44 is halted by the microprocessor 32 upon receipt of a signal by the microprocessor 32 from at least one of the pressure/weight sensor 34 and the pedometer 36. A reset button 42 is also connected to the microprocessor 32 for allowing a user to manually clear the memory 38 and thereby begin a new set of weight and distance measurements.

Figure 5A:
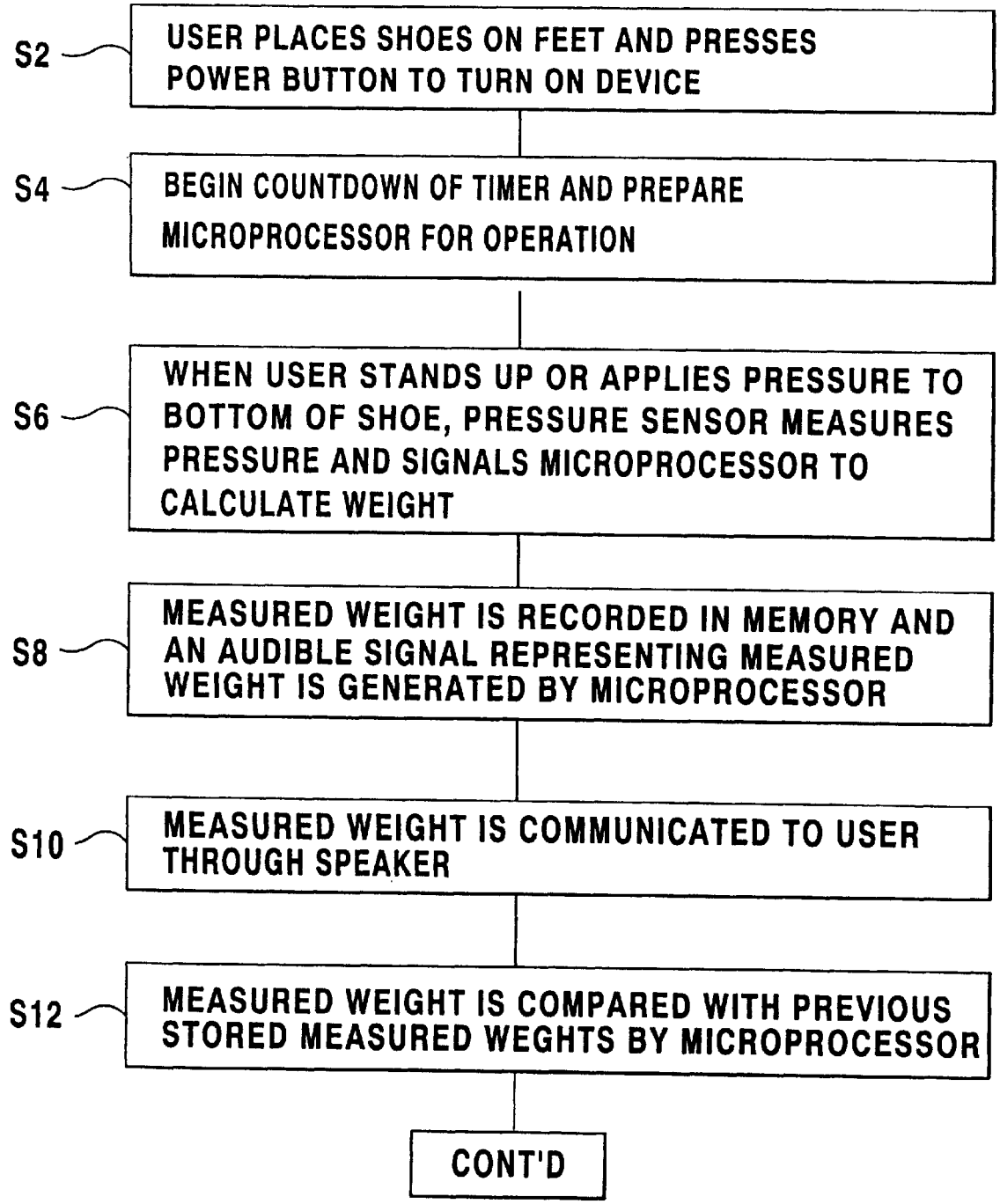
FIGS. 5A and 5B show a flow chart illustrating the operating process of the shoe including weight and distance traveled monitoring device of the present invention.
Figure 5B:
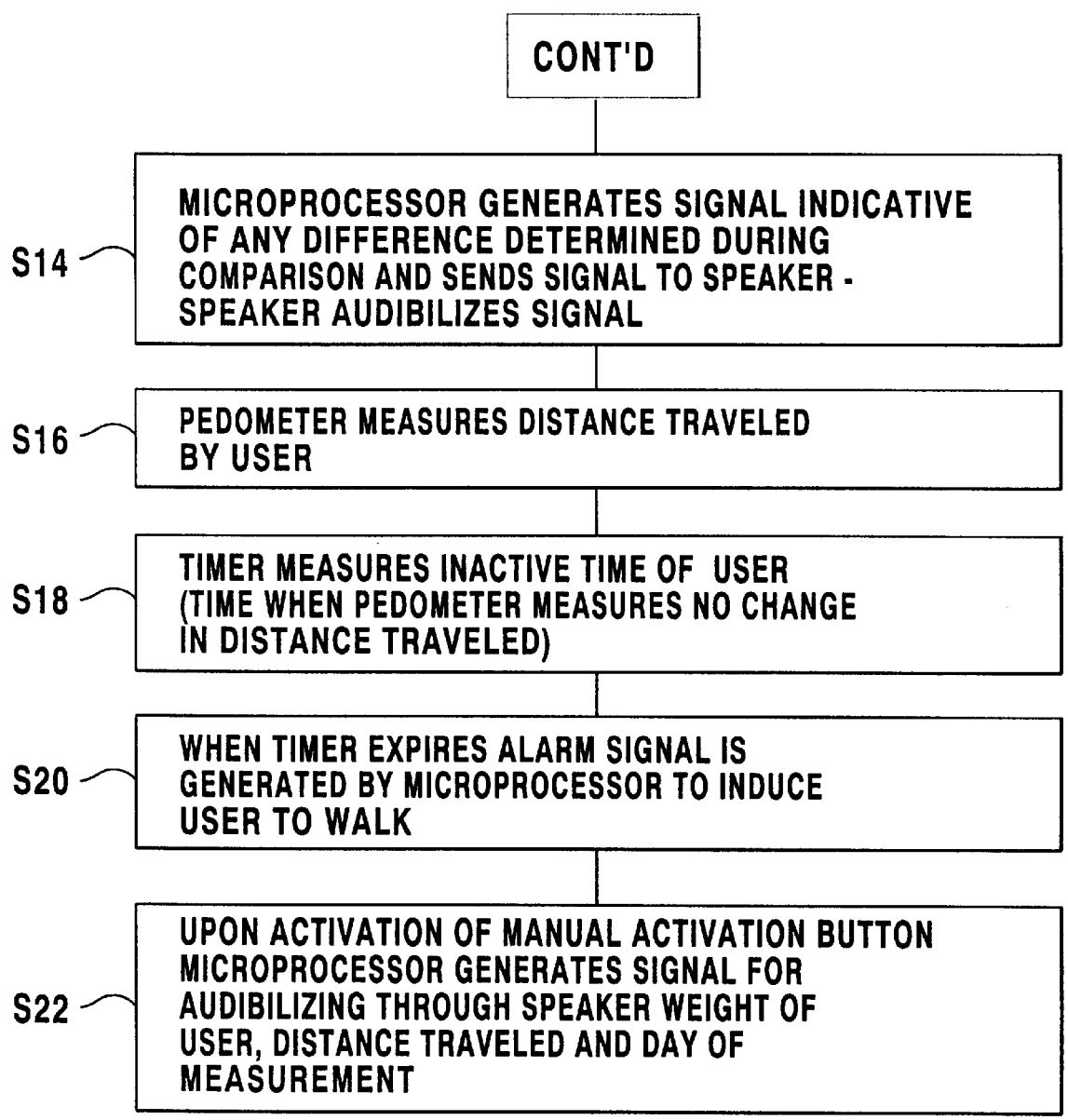

The operation of the shoe 12 including weight and distance traveled monitoring device 10 will now be described with reference to the figures and specifically FIG. 5. In operation, the shoe 12 including weight and distance traveled monitoring device 10 is placed on and removably secured to a user's feet 16. Once positioned on the user's feet 16, the power switch 30 is pressed to supply power to the device 10 and allow for the microprocessor 32 to begin receiving measurements as discussed in step S2. Turning on the power switch 30 causes the timer 44 to begin counting down the predetermined inactive time period and prepares the microprocessor for operation as stated in step S4.

When the user 13 is ready to begin exercising and stands up, pressure is sensed by the pressure sensor 34 and a signal indicative of the amount of pressure sensed is sent to the microprocessor 32 for use in calculating the weight of the user 13 as described in step S4. Standing up by the user 13 will also cause the microprocessor 32 to reset the timer 44 upon receipt of the sensed pressure value from the pressure sensor 34. The calculated weight is then recorded in the memory 38 and an audible signal communicating the calculated weight to the user is provided through the speaker 26 as discussed in steps S8 and S10. The measured weight is then compared to a previous weight value stored in the memory 38 and an audible signal is provided to the user through the speaker 26 indicating any change in weight from the previous measurement as stated in steps S12 and S14.

The user will now begin to exercise by either running or walking. As the user runs or walks, the pedometer 36 will measure a distance traveled thereby as described in step S16. When the user ceases forward movement, the timer 44 is caused to begin measuring the inactive time of the user as discussed in step S18. When the timer 44 expires, an alarm signal is generated as stated in step S20. The alarm signal may be in the form of an audible alarm or buzzer or words encouraging or prodding the user into continuing to exercise. The timer 44 will be reset when the user resumes exercising.

Upon activation of the manual activation button 28, the microprocessor 32 will generate an audible signal to be sent to the speaker 26 for communicating the weight and distance traveled to the user as described in step S22. The clock 40 will continue to count for a predetermined period of time and will remain active even when the power switch 30 interrupts the supply of power to the microprocessor 32. When the clock 40 counts to a predetermined value, the values calculated by the microprocessor 32 and stored in the memory 38 will be erased to make room for other values.

From the above description it can be seen that the shoe including weight and distance traveled monitoring device of the present invention is able to overcome the shortcomings of prior art devices by providing a shoe including weight and distance traveled monitoring device which is able to determine a body weight of a user and includes a tachometer for measuring a distance traveled by the user when wearing the shoes. The shoe including weight and distance traveled monitoring device is able to audibly communicate the measured weight and distance traveled by the user and also includes an interactive button which the user may activate to be informed of their weight and distance traveled. The shoe including weight and distance traveled monitoring device is able to measure time of inactivity of user and generate an alarm signal if user has been inactive for a predetermined amount of time and provide audible encouragement upon determining user has lost weight between times of measurement or induce user to exercise upon determining user has gained weight between times of measurements. Furthermore, the shoe including weight and distance traveled monitoring device of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A shoe including weight and distance traveled monitoring device for determining a weight and distance traveled by a person wearing said shoe, said shoe including weight and distance traveled monitoring device comprising:
   a) means for sensing a pressure and generating a signal indicative of the sensed pressure positioned in a heel of said shoe;
   b) means for measuring a distance traveled by said shoe and generating a signal indicating the measured distance positioned in the heel of said shoe;
   c) a microprocessor connected to receive said signal from said sensing means and said signal from said measuring means for processing said received signals to determine a weight of the person wearing said shoe and a distance traveled by the person wearing the shoe;
   d) means connected to said microprocessor for producing an audible signal indicating said determined weight and distance traveled by the person wearing the shoe; and
   e) a timer for detecting a predetermined period during which the person wearing the shoe is inactive and triggering said microprocessor to generate an audible signal prodding the person to exercise.

2. The shoe including weight and distance traveled monitoring device as recited in claim 1, wherein said means for sensing is a pressure sensor.

3. The shoe including weight and distance traveled monitoring device as recited in claim 2, wherein said means for measuring is a pedometer.

4. The shoe including weight and distance traveled monitoring device as recited in claim 1, further comprising a timer for detecting a predetermined period during which the person wearing the shoe is inactive and triggering said microprocessor to generate an audible signal prodding the person to exercise.

5. The shoe including weight and distance traveled monitoring device as recited in claim 1, wherein said timer is reset by said microprocessor upon receipt of said signal from said measuring means.

6. A shoe including weight and distance traveled monitoring device for determining a weight and distance traveled by a person wearing said shoe, said shoe including weight and distance traveled monitoring device comprising:
   a) means for sensing a pressure and generating a signal indicative of the sensed pressure positioned in a heel of said shoe;
   b) means for measuring a distance traveled by said shoe and generating a signal indicating the measured distance positioned in the heel of said shoe;
   c) a microprocessor connected to receive said signal from said sensing means and said signal from said measuring means for processing said received signals to determine a weight of the person wearing said shoe and a distance traveled by the person wearing the shoe;
   d) means connected to said microprocessor for producing an audible signal indicating said determined weight and distance traveled by the person wearing the shoe; and
   e) a memory device connected to said microprocessor for storing said determined weight and distance traveled and wherein said microprocessor compares a determined weight with said determined weight stored in memory to detect changes in weight of the person wearing said shoe.

7. The shoe including weight and distance traveled monitoring device as recited in claim 6, further comprising means connected to said microprocessor for clearing said memory.

8. The shoe including weight and distance traveled monitoring device as recited in claim 6, wherein upon detection of a change in weight said microprocessor generates an audible signal indicative of said detected change in weight and sends said audible signal to said producing means for communicating said change in weight to the person wearing said shoe.

9. The shoe including weight and distance traveled monitoring device as recited in claim 6, further comprising a clock for measuring a predetermined period of time and resetting said memory upon expiration of said predetermined period of time.

10. A weight and distance traveled monitoring device positioned within a shoe for determining a weight and distance traveled by a person wearing the shoes, said weight and distance traveled monitoring device comprising:
   a) means for sensing a pressure and generating a signal indicative of the sensed pressure positioned in a heel of the shoe;
   b) means for measuring a distance traveled by the shoe and generating a signal indicating the measured distance positioned in the heel of the shoe;
   c) a microprocessor connected to receive said signal from said sensing means and said signal from said measuring means for processing said received signals to determine a weight of the person wearing the shoe and a distance traveled by the person wearing the shoe;
   d) means connected to said microprocessor for producing an audible signal indicating said determined weight and distance traveled by the person wearing the shoe; and
   e) a timer for detecting a predetermined period during which the person wearing the shoe is inactive and triggering said microprocessor to generate an audible signal prodding the person to exercise.

11. The weight and distance traveled monitoring device as recited in claim 10, wherein said means for sensing is a pressure sensor.

12. The weight and distance traveled monitoring device as recited in claim 11, wherein said means for measuring is a pedometer.

13. The weight and distance traveled monitoring device as recited in claim 10, wherein said timer is reset by said microprocessor upon receipt of said signal from said measuring means.

14. The weight and distance traveled monitoring device as recited in claim 10, further comprising means connected to said microprocessor for clearing said memory.

15. A shoe including weight and distance traveled monitoring device for determining a weight and distance traveled by a person wearing said shoe, said shoe including weight and distance traveled monitoring device comprising:
   a) means for sensing a pressure and generating a signal indicative of the sensed pressure positioned in a heel of said shoe;
   b) means for measuring a distance traveled by said shoe and generating a signal indicating the measured distance positioned in the heel of said shoe;
   c) a microprocessor connected to receive said signal from said sensing means and said signal from said measuring means for processing said received signals to determine a weight of the person wearing said shoe and a distance traveled by the person wearing the shoe;
   d) means connected to said microprocessor for producing an audible signal indicating said determined weight and distance traveled by the person wearing the shoe; and
   e) means connected to said microprocessor for triggering said microprocessor to generate an audible signal indicative of a current determined distance traveled, and said audible signal indicative of a current determined distance traveled being sent to said producing means for communicating said current determined distance traveled to the person wearing said shoe.

16. A weight and distance traveled monitoring device positioned within a shoe for determining a weight and distance traveled by a person wearing the shoes, said weight and distance traveled monitoring device comprising:

a) means for sensing a pressure and generating a signal indicative of the sensed pressure positioned in a heel of the shoe;

b) means for measuring a distance traveled by the shoe and generating a signal indicating the measured distance positioned in the heel of the shoe;

c) a microprocessor connected to receive said signal from said sensing means and said signal from said measuring means for processing said received signals to determine a weight of the person wearing the shoe and a distance traveled by the person wearing the shoe;

d) means connected to said microprocessor for producing an audible signal indicating said determined weight and distance traveled by the person wearing the shoe; and e) a memory device connected to said microprocessor for storing said determined weight and distance traveled, wherein said microprocessor compares a determined weight with said determined weight stored in memory to detect changes in weight of the person wearing said shoe.

17. The shoe including weight and distance traveled monitoring device as recited in claim 16, wherein upon detection of a change in weight said microprocessor generates an audible signal indicative of said detected change in weight and sends said audible signal to said producing means for communicating said change in weight to the person wearing said shoe.

18. The weight and distance traveled monitoring device as recited in claim 16, further comprising a clock for measuring a predetermined period of time and resetting said memory upon expiration of said predetermined period of time.

19. A weight and distance traveled monitoring device positioned within a shoe for determining a weight and distance traveled by a person wearing the shoes, said weight and distance traveled monitoring device comprising:

a) means for sensing a pressure and generating a signal indicative of the sensed pressure positioned in a heel of the shoe;

b) means for measuring a distance traveled by the shoe and generating a signal indicating the measured distance positioned in the heel of the shoe;

c) a microprocessor connected to receive said signal from said sensing means and said signal from said measuring means for processing said received signals to determine a weight of the person wearing the shoe and a distance traveled by the person wearing the shoe;

d) means connected to said microprocessor for producing an audible signal indicating said determined weight and distance traveled by the person wearing the shoe; and e) means connected to said microprocessor for triggering said microprocessor to generate an audible signal indicative of a current determined distance traveled, and said audible signal indicative of a current determined distance traveled being sent to said producing means for communicating said current determined distance traveled to the person wearing said shoe.

* * * * *